A. A. JACKSON.
AUTOMOBILE SIGNAL.
APPLICATION FILED SEPT. 29, 1916.

1,292,790.

Patented Jan. 28, 1919.
2 SHEETS—SHEET 1.

Inventor
A. A. Jackson
By
Attorney

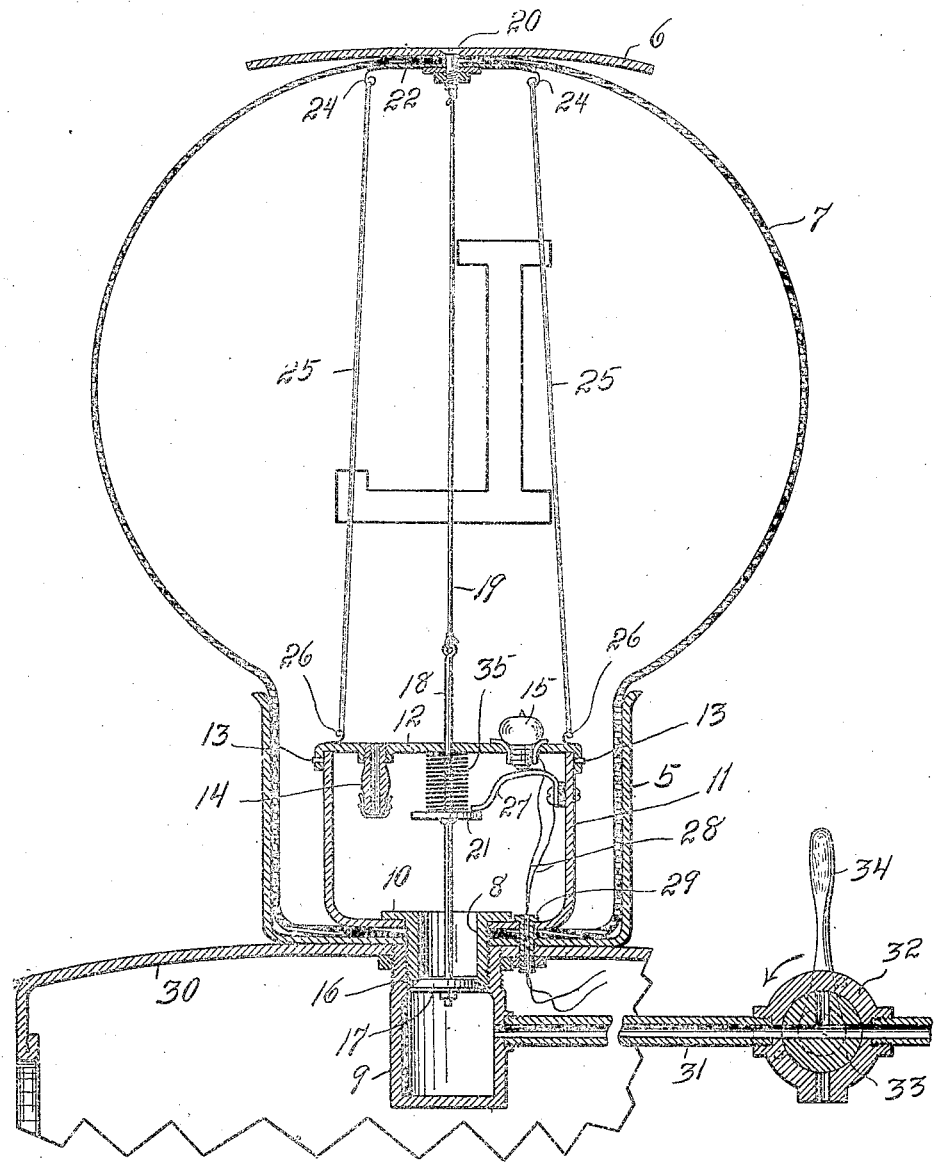

UNITED STATES PATENT OFFICE.

ALFRED A. JACKSON, OF DENVER, COLORADO, ASSIGNOR OF ONE-THIRD TO HARRY S. WALKER AND ONE-THIRD TO LEO E. PACKARD, BOTH OF DENVER, COLORADO.

AUTOMOBILE-SIGNAL.

1,292,790.

Specification of Letters Patent. Patented Jan. 28, 1919.

Application filed September 29, 1916. Serial No. 122,783.

*To all whom it may concern:*

Be it known that I, ALFRED A. JACKSON, a citizen of the United States, residing at the city and county of Denver and State of Colorado, have invented certain new and useful Improvements in Automobile-Signals; and I declare the following to be a full, clear, and exact description of the invention, such as will enable others skilled in the art to which it appertains to make and use the same, reference being had to the accompanying drawings, and to the characters of reference marked thereon, which form a part of this specification.

The present invention relates to improvements in automobile signals and pertains more particularly to a device which can be quickly and easily operated by the driver of a machine to indicate that the vehicle is about to turn in a given direction.

Increased traffic conditions, especially in the large congested cities, have made it incumbent upon automobile drivers to give some regularly prescribed signal indicating the direction they intend to take. In order to comply with the regulations in this respect the drivers of cars usually put out one hand to give the signal. It not infrequently happens that at the same time it is necessary to blow the horn or shift the gear lever, all of which necessitates extremely quick work on the part of the driver.

It is the object of the present invention to provide a device which can be quickly and easily operated to display a signal indicating the direction in which the machine is about to turn and at the same time give an audible signal to attract attention to the fact that the indicator is being displayed.

A further object consists in providing a device of the character described adapted to be pneumatically operated.

The invention consists briefly in mounting at any suitable place on either side of the machine a signaling device as above referred to. The device consists of an elastic inflatable member normally contained within a small cylindrical casing which in the present instance is rigidly carried on the wheel guard. The casing is provided with a removable top secured to the upper portion of the inflatable member so that as the latter is expanded the casing top is elevated. A smaller fixed casing is provided for the device, and is surrounded completely by the inflatable signal member. An electric light and a sound emitting device such as a squawker are carried on the inner casing and each is adapted to be operated for its particular purpose when the elastic member is inflated. By this arrangement, as the inflated member becomes expanded it is moved upwardly and out of the casing so as to display an illuminated signal and at the same time a sounding device is operated to attract attention.

With these and other objects in view the invention consists in the combination and arrangement of parts more fully set forth in the following specification, illustrated in the accompanying drawings and more particularly pointed out in the appended claims.

In the drawings Figure 1 illustrates an automobile, in rear elevation having one embodiment of the present invention applied thereto.

Fig. 3 is a similar view of the invention illustrating the signal device in its operative inflated position.

Figure 1:
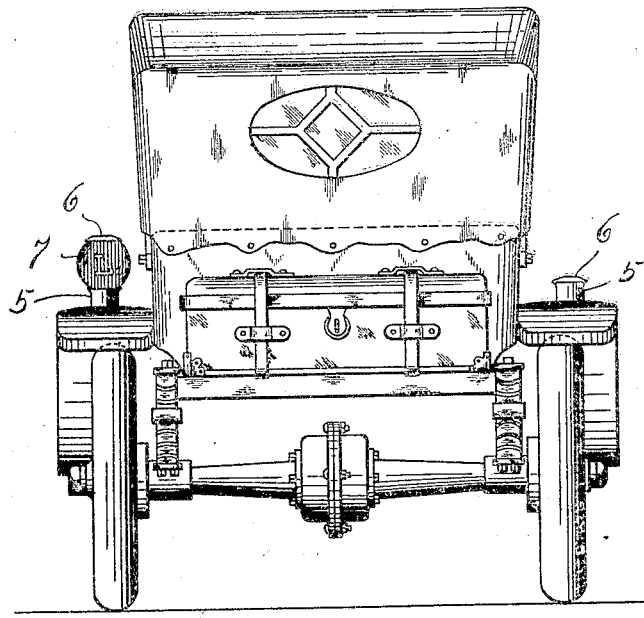
Figure 2:
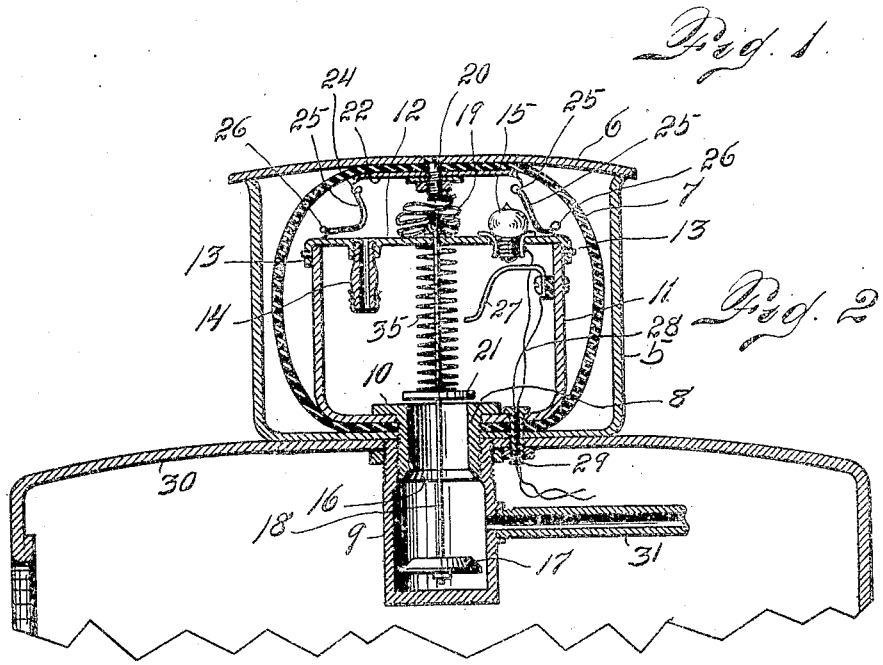
Fig. 2 is a transverse, vertical section of the invention drawn to a larger scale, the signaling device being shown in its normal deflated position.

Referring now to the drawings, the invention is shown applied to the wheel guards on either side of an automobile and consists of a casing 5 preferably cylindrical in form. This casing is provided with a removable cover 6 which is centrally attached to the upper portion of an elastic inflatable member 7, resembling in shape and size a toy balloon. With the parts shown in their normal position illustrated in Fig. 2, the elastic member 7 is completely contained within the casing 5 and is provided at its lower part with a circular opening in which is inserted and permanently attached a sleeve or collar 8, the lower end of which extends downwardly through the bottom of the casing 5 and has screw-threaded engagement with a cylindrical member 9. At the upper end of the collar 8 a flange 10 is provided adapted to overlap and engage a circular orifice formed in the lower side of a second auxiliary casing 11. It will be seen that by suitably tightening the lower chamber 9 upon the collar 8 the lower walls of the inner casing 11 and the lower edges of the inflatable member 7 are all securely clamped together.

The inner casing 11 is provided with a removable cover member 12 adapted to be secured thereto by means of bayonet joints 13. The cover 12 has secured to its lower side a squawker 14 and is also provided with an incandescent electric lamp 15 the globe of which extends above its upper surface. The inner bore of the collar member 8 is of slightly smaller diameter than the inner surface of the chamber 9 with which it communicates and it is provided with a beveled edge 16 forming a suitable valve seat for the valve 17 which is carried at the lower end of a valve stem 18. This valve stem extends vertically upward passing through a central perforation in the upper cover member 12 of the inner casing 11 and is provided at its upper end with an eye to which is secured one end of a flexible cord member 19 the other end of which is secured to the fastening means 20 between the cover 6 of the casing 5 and the inflatable member 7. A small coiled spring 35 encircles a portion of the valve stem 18 having its upper end contact with the inner surface of the cover 12 and its lower end abutting against the upper surface of a washer 21 suitably carried on the valve stem. The function of this spring is to normally hold the parts in the position shown in Fig. 2 and it will be seen that the normal position of the valve 17 is removed from its valve seat and in proximity with the lower end of the casing or chamber 9. A small, rigid plate 22 is carried within the upper portion of the inflated member 7 being secured by means of the fastening device 20 which extends inwardly through the casing cover 6. This plate 22 is provided at its opposite ends with depending, curved hook members 24 over which are looped the ends of elastic bands 25, the lower ends of which are similarly hooked over a pair of upwardly extending hooks 26 provided at the upper sides of the casing cover 12. Within the case 11 and suitably located at one side thereof below and adjacent to the lower extremity of the lamp 15 is a spring contact member 27 insulated from the casing 11 and having its end normally bent downwardly out of contact with the lower end of the lamp and in the path of the washer 21. The contact of the lamp 15 and the contact 27 are suitably connected by wires 28 which pass through a stuffed thimble 29 suitably provided and passing through the inner casing 11 the inflatable member 7, the outer casing 5 and the wheel guard 30 upon which the whole device is carried. These wires may be connected with a storage battery or any other suitable source of supply. A transverse pipe 31 extends into the side of the chamber casing 9 and supplies the device with the necessary fluid under compression. Suitably located in the pipe 31 is a valve casing 32 in which is carried a rotary 3-way valve member 33 operated by a handle 34. The device may be attached to the compressed air tank or it may be suitably connected with the exhaust of the engine. The body of the inflatable member 7 may be of any desired color and is preferably provided with translucent letters at its front and rear surfaces formed of a different color so as to be readily discernible when the interior of the device is illuminated.

From the detailed description of the device the operation will be readily understood. Assuming that the parts are in their normal position shown in Fig. 2 and it is desired to turn the machine to the left, the operator or driver, by manipulating the valve handle 34, connects the pipe 31 with the source of compressed air. This allows the air to pass upwardly through the collar 8 into the inner casing 11 from which it passes through the squawker 14 into the interior of the inflatable member 7 causing the latter to become expanded. As the member 7 increases in size it rises out of the casing 5 elevating with it the upper cover of this case and its expansion continues until the valve 17 has become seated upon the valve seat 16. It will be seen that simultaneously with the expansion of the member 7 the elastic members 25 and 19 are also expanded and the valve stem 18 passes upwardly through the casing cover 12 compressing the coiled spring 35. When the washer has risen sufficiently to contact with the lower end of the spring member 27 it moves the latter slightly upwardly into contact with the lower extremity of the electric lamp 15 closing the circuit and causing the lamp to be illuminated. It will thus be seen that by simply manipulating the handle 34 so as to cause the valve 33 to move a quarter turn about its axis the signal device is operated whereby a visible illuminated balloon-shaped member is caused to appear at the proper side of the automobile and at the same time a loud squawking noise is emitted to attract the attention of approaching or following car drivers. It will be understood that the markings on the surfaces of the inflated member may be varied as desired; in the present form the letter "L" is exposed to indicate that the machine is about to turn to the left. As soon as the turn has been made the device may be returned to its normal position by further turning the valve handle 34 so as to connect the pipe 31 with the atmosphere cutting off the supply of compressed air and allowing the escape of the air contained within the device. The coiled spring 35 will then act in conjunction with the several elastic members 25—25 and 19 to return the elastic member 7 within the casing 5 and to reseat the cover 6 on said casing.

It will thus be seen that a simple and effective signal is provided which can be both seen and heard and which requires but very little attention on the part of the operator allowing him to devote most of his time to the other duties necessary when operating a machine through a congested place. The cover 6 not only serves to protect the several mechanisms contained within the casing 5 when the parts are in their normal position but it also acts as a protector against the weather for the member 7 when the device is inflated.

Having described my invention what I claim is:

1. An automobile signal comprising an elastic member and a single operating member for simultaneously inflating and illuminating said member.

2. An automobile signal comprising a casing, an elastic signal normally carried in a deflated condition within said casing, pneumatic means for causing said member to become inflated and project above said casing.

3. An automobile signal comprising an elastic member having a sound emitter and a lamp contained therein, and means for simultaneously inflating said member, sounding said emitter, and illuminating said lamp.

4. An automobile signal comprising an elastic display member having a squawker and lamp contained therein and pneumatically operated means for simultaneously inflating said display member, sounding said squawker and illuminating said lamp.

5. An automobile signal comprising a casing, an elastic member normally carried within said casing in deflated condition, a second casing within said member, a sound emitter and lamp carried on said inner casing, and pneumatic means for inflating said elastic member out of said casing and simultaneously sounding the emitter and illuminating the lamp.

6. An automobile signal comprising a casing, an elastic member normally contained therein, a removable cover for said casing secured to said elastic member and means for causing said member to become inflated and project above the casing.

7. An automobile signal comprising an elastic display member, pneumatic means for inflating same and elastic bands for returning it to its normal deflated condition.

8. An automobile signal comprising an elastic display member, pneumatic means for inflating said member, and simultaneously giving an audible signal and elastic bands contained within said member for returning it to a normal deflated condition.

In testimony whereof I affix my signature, in presence of two witnesses.

ALFRED A. JACKSON.

Witnesses:
CHAS. E. PARSONS,
HELEN A. VILLEMAGNE.